United States Patent [19]

Cox

[11] 4,022,485
[45] May 10, 1977

[54] COLLAPSIBLE BICYCLE

[76] Inventor: Elward LeRoy Cox, 2737 Grosse Point Road, Evanston, Ill. 60201

[22] Filed: Apr. 5, 1976

[21] Appl. No.: 673,702

[52] U.S. Cl. .............................................. 280/287
[51] Int. Cl.² ....................................... B62K 15/00
[58] Field of Search .......... 280/287, 288, 7.1, 7.15; 180/33

[56] References Cited

UNITED STATES PATENTS

| | | | |
|---|---|---|---|
| 607,325 | 7/1898 | Barnes | 280/287 |
| 640,680 | 1/1900 | Merrow | 280/287 X |
| 3,374,009 | 3/1968 | Jeunet | 280/287 |
| 3,710,883 | 1/1973 | Rizzo | 180/33 |

FOREIGN PATENTS OR APPLICATIONS

| | | | |
|---|---|---|---|
| 481,050 | 5/1953 | Italy | 280/287 |
| 647,864 | 10/1962 | Italy | 280/287 |
| 195,205 | 1/1938 | Switzerland | 280/287 |

*Primary Examiner*—Joseph F. Peters, Jr.
*Assistant Examiner*—Terrance L. Siemens
*Attorney, Agent, or Firm*—Tilton, Fallon, Lungmus, Chestnut & Hill

[57] ABSTRACT

A collapsible bicycle includes a rigid main frame and a collapsible rear frame movable between riding and storage positions. The rigid main frame supports the front wheel, pedals, handlebars, and seat, and the rear frame supports the rear wheel. The rear frame includes a first pair of struts which are pivotally connected to the main frame at the lower rear portion thereof and a second pair of struts which are pivotally connected to the first pair of struts. When the rear frame is in the riding position, the first pair of struts extends rearwardly from the main frame, and the second pair of struts extends upwardly and forwardly from the rear ends of the struts of the first pair to a connector on the upper rear portion of the main frame which connects the second pair of struts to the rear of the main frame. When the bicycle is to be stored, the struts of the second pair are disconnected from the connector at the rear of the main frame, the two pairs of struts are pivoted forwardly about the pivot connection between the main frame and the first pair of struts, and the struts of the second pair are connected to a second connector on the upper front portion of the main frame.

6 Claims, 7 Drawing Figures

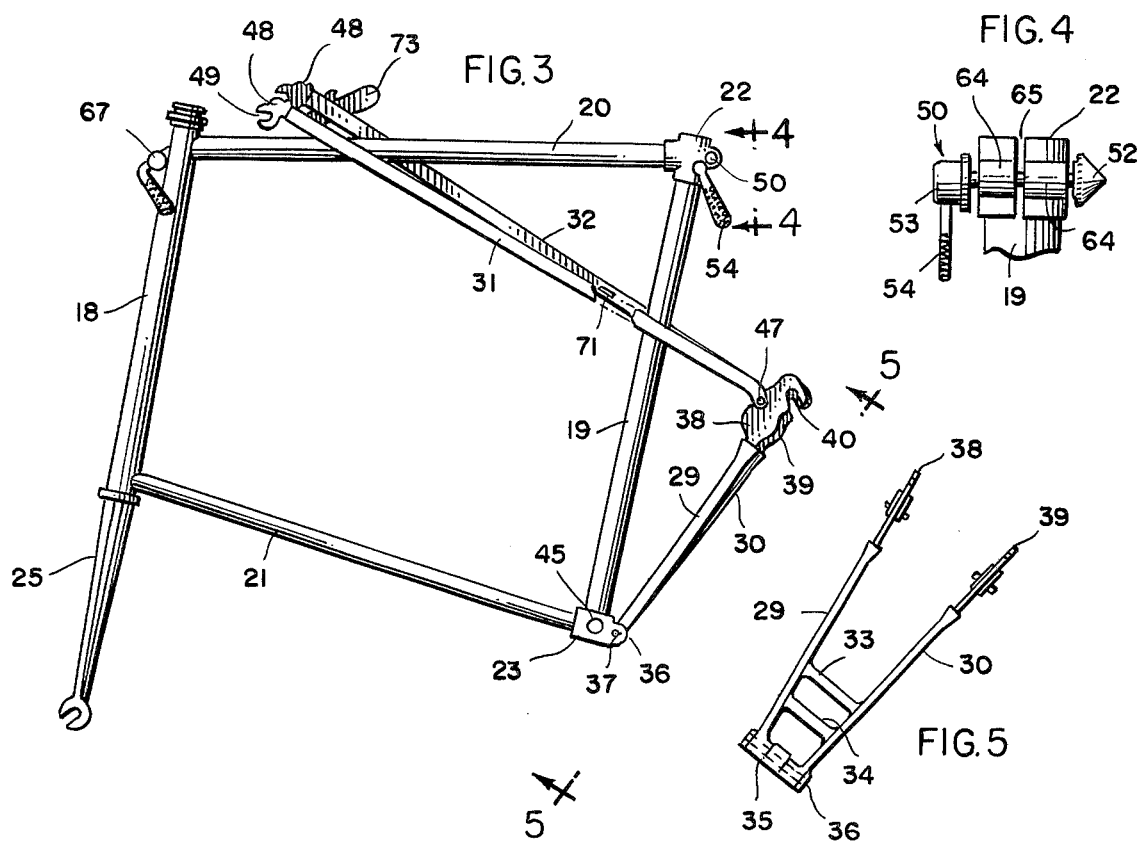
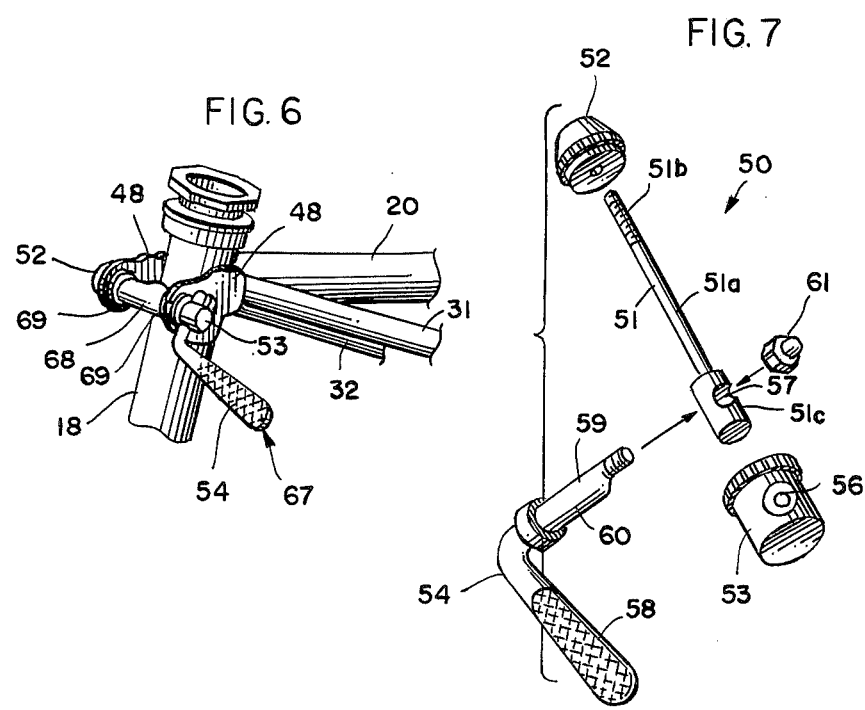

COLLAPSIBLE BICYCLE

BACKGROUND AND SUMMARY

This invention relates to a collapsible bicycle frame, and, more particularly, to a bicycle frame which includes a rigid main frame and a rear frame which is pivotally connected to the front frame and movable between riding and storage positions.

Various types of collapsible or folding bicycles have been proposed in the past. However, many of these bicycles are constructed in a way that makes it difficult and time-consuming to change the bicycle from its riding position to its collapsed or folded position. Further, with the increasing popularity of multiple speed gear mechanisms, e.g., five speed and ten speed mechanisms, it is desirable that the bicycle can be moved between the riding and collapsed positions without interfering with the gear mechanism.

A bicycle constructed in accordance with the invention can be easily and quickly moved between the riding and collapsed positions. The bicycle includes a non-collapsing, rigid main frame which can be made as strong as desired. The collapsible rear frame includes a first pair of struts which are pivotally connected to the bottom of the main frame. The ends of the struts are provided with slots for receiving the axle of the rear wheel, and the gear mechanism is mounted on one of the struts. A second pair of struts is pivotally connected to the ends of the struts of the first pair, and when the rear frame is in its riding position the struts of the second pair extend forwardly and upwardly and are releasably connected to the upper rear of the main frame. When the rear frame is to be folded, the rear wheel is removed from between the struts, the upper ends of the struts of the second pair are disconnected from the main frame, and both pairs of struts are pivoted forwardly until the upper ends of the struts of the second pair can be connected to the upper front of the frame. Lever-operated quick-connect-disconnect connecting members are mounted on the main frame at the front and rear thereof for connecting the struts of the second pair to the frame in the folded and riding positions, respectively, and the rear connecting member is also used to clamp the seat to the main frame. The struts of the first pair are pivotally connected to the frame adjacent the center of the pedal sprocket, and the distance between the gear mechanism and the pedal sprocket remains substantially constant as the rear frame is pivoted so that the chain can be maintained in position around the pedal sprocket and the gear mechanism as the rear frame moves between its riding and folded positions. The only connection that must be made to maintain the rear frame in either position is at the ends of the struts of the second pair.

DESCRIPTION OF THE DRAWING

The invention will be explained in conjunction with an illustrative embodiment shown in the accompanying drawing, in which:

FIG. 3 is a side elevational view showing the bicycle frame being moved from the riding position to the storage position (the pedals and sprocket being omitted for clarity);

FIG. 4 is a fragmentary end view taken along the line 4—4 of FIG. 3;

FIG. 5 is a fragmentary view taken along the line 5—5 of FIG. 3;

FIG. 6 is a fragmentary perspective view of the front upper portion of the frame; and FIG. 7 is an exploded view of one of the quick-connect-disconnect connectors.

DESCRIPTION OF SPECIFIC EMBODIMENT

Figure 1:
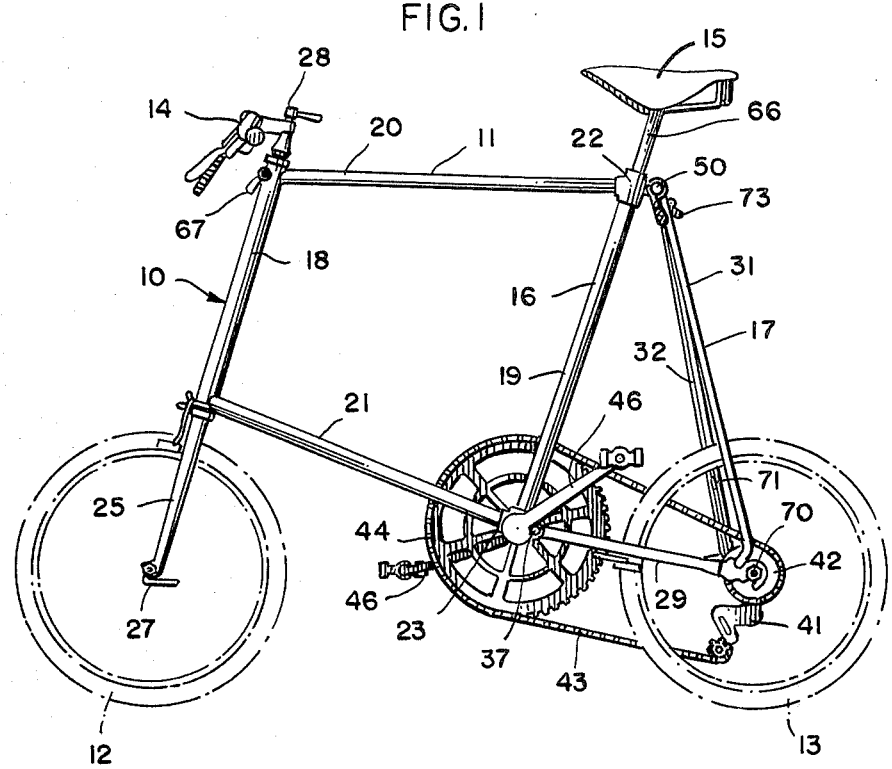
FIG. 1 is a side elevational view of a bicycle constructed in accordance with the invention.

Referring first to FIG. 1, the numeral 10 designates generally a collapsible or folding bicycle which includes a frame 11, front and rear wheels 12 and 13, handlebars 14, and seat 15. The frame 10 is comprised of a rigid main or front frame 16 and a rear frame 17, which is movable between the riding position shown in FIG. 1 and a collapsed or folded storage position shown in FIG. 2.

The main frame includes generally vertically extending front and rear tubular frame members 18 and 19 and top and bottom tubular frame members 20 and 21. The top and bottom frame members are rigidly connected to the front member, as by welding. The rear frame member is connected to the top frame member by a T-shaped connector 22, and the rear frame member is connected to the bottom frame member by an L-shaped connector 23.

The upper end of a fork 25 is rotatably positioned within the tubular front frame member 18, and the downwardly extending stem of the handlebars 14 extends into the upper end of the front frame member. The axle of the front wheel is connected to the fork by a conventional quick-connect-disconnect connector 27, which will be explained hereinafter with respect to FIG. 7. The handlebars are connected to the fork by another quick-connect-disconnect connector 28.

The rear frame 17 includes a first pair of struts 29 and 30 (see also FIGS. 3 and 5) which extend rearwardly from the connector 23 which connects the rear and bottom frame members 21 and 19 and a second pair of struts 31 and 32 which extend upwardly and forwardly from the rear ends of the struts 29 and 30. The struts 29 and 30 are joined together by cross braces 33 and 34, and the forward ends of the struts are secured to a sleeve 35. The sleeve 35 is positioned between a pair of support trunnions 36 on the connector 23 and is supported for pivoting movement by a pin 37 which extends through the trunnions.

Wheel-support brackets 38 and 39 are attached to the rear ends of the struts 29 and 30, and each bracket is provided with a slot 40 for receiving the axle of the rear wheel. A conventional five speed derailleur gear mechanism 41 (see FIGS. 1 and 2) is mounted on the wheel bracket 39. A five-gear cluster 42 is mounted on the rear axle, and a drive chain 43 is threaded through the derailleur mechanism and drives the gear cluster in the usual manner. The large drive sprocket 44 is mounted on a pedal shaft which extends through an opening 45 (FIG. 3) in the connector 23, and pedals 46 extend outwardly from the shaft.

Each of the struts 31 and 32 is pivotally connected to one of the wheel brackets 38 and 39 by a pin 47, and each strut extends upwardly to the connector 22 which connects the top and rear frame members 20 and 19. A hook attachment 48 is connected to the upper end of each strut, and each hook attachment is provided with a slot 49 which extends slightly angularly with respect to the longitudinal axis of the struts. Each of the slotted hook attachments is positioned over the shaft of a quick-connect-disconnect connector 50 which is mounted on the rear frame member 19.

Referring to FIG. 7, the connector 50 includes a shaft 51 which includes a narrow central portion 51a, an externally threaded end portion 51b, and a radially enlarged end portion 51c. An end nut 52 is threaded onto the end portion 51a of the shaft, and another end nut 53 is slidably received on the enlarged end portion 51b and is provided with a pair of openings 56 which are aligned with an opening 57 in the shaft. A lever 54 includes a handle portion 58 and a camming portion 59 which is inserted through the openings in the nut 53 and shaft 51. The camming portion includes a central cam 60 which extends eccentrically radially outwardly with respect to the axis of the camming portion and which is engageable with the wall of the opening 57 in the shaft 51. The camming portion of the lever is retained within the nut 53 by an acorn nut 61 which is screwed onto the protruding threaded end of the camming portion.

The connector 22 is a split-ring type connector and is provided with a gap 63 (FIG. 4) in the rear thereof. The connector includes a lug 64 on each side of the gap, and the shaft 51 of the connector 50 extends through aligned openings in the lugs. When the lever 54 is turned to rotate the camming portion, the connector 53 is cammed relative to the shaft 51. Movement of the lever in one direction moves the connector 53 toward the connector 52 and clamps the nuts against the lugs 64. Accordingly, the hooks 48 of the struts can be securely locked to the connector by inserting the slot of each hook over the shaft 51 between one of the nuts and one of the lugs and rotating the lever.

The connector 50 also serves to secure the seat 15. The seat includes the usual mounting shaft 66 (FIG. 1) which extends downwardly through the split connector 22 and into the rear tubular frame member 19. When the lever 54 is turned to force the nuts against the lugs 64, the gap between the lugs decreases, and the mounting shaft is clamped within the frame member 19. For this purpose the upper end of the frame member can also be gapped if desired.

Another quick-connect-disconnect connector 67 (see particularly FIG. 6) is mounted on the front frame member just below the upper end thereof. The connector 67 similarly includes a shaft 51 (not shown in FIG. 6) which is slidable within a sleeve 68 which is attached to the frame member 18. A pair of abutment washers 69 are secured to the ends of the sleeve, and a pair of nuts 52 and 53 are movable toward the washers by the lever 54.

When the struts 31 and 32 of the rear frame are locked in the position illustrated in FIG. 1 by connector 50, the struts 31 and 32 and 29 and 30 form a rigid frame and fixedly support the rear wheel and the derailleur gear mechanism. When it is desired to fold or collapse the bicycle for transportation or storage, the quick connectors 27 and 28 are loosened to permit the front wheel and handlebars to be removed from the fork and the front frame member 18, respectively. The quick connector 70 is loosened to permit the rear wheel to be removed from the wheel brackets 38 and 39, and the slack in the chain that is created when the chain is removed from the gear cluster is taken up by hooking the chain over a hook 71 (FIGS. 1 and 3) on the strut 32. This maintains the tension in the chain and prevents the chain from becoming disengaged from the derailleur mechanism while the bicycle is in the folded position.

The connector 50 is then loosened, and this frees the struts 31 and 32 and allows the seat to be removed. The struts 31 and 32 and the struts 29 and 30 may then be pivoted forwardly toward the connector 67 on the front frame member about the pivot pin 37 until the hooks 48 of the struts 31 and 32 are positioned over the shaft of the connector between the washers 69 and the end nuts 52 and 53 as shown in FIG. 6. The lever 54 is then rotated to squeeze the nuts together and clamp the hooks. The struts 31 and 32 extend forwardly beyond the rear frame member 19 on opposite sides thereof, and the struts 29 and 30 extend substantially parallel with the rear frame member 19 when the rear frame is in the folded position. This minimizes the amount of space which the folded bicycle frame occupies outwardly of the area of the rigid main frame. If desired, the ends of the struts 31 and 32 can be loosely connected by a wire or cable 73 to ensure that the struts pivot generally together if the operator loses his hold on one of the struts.

The struts will pivot primarily about the pivot pin 37, and, depending upon the location of the connector 67 relative to the hooks 48 of the struts, the pivot pins 47 could be eliminated. In most cases, however, the struts 31 and 32 will pivot slightly relative to the struts 29 and 30 about the pivot pins 47.

Figure 2:
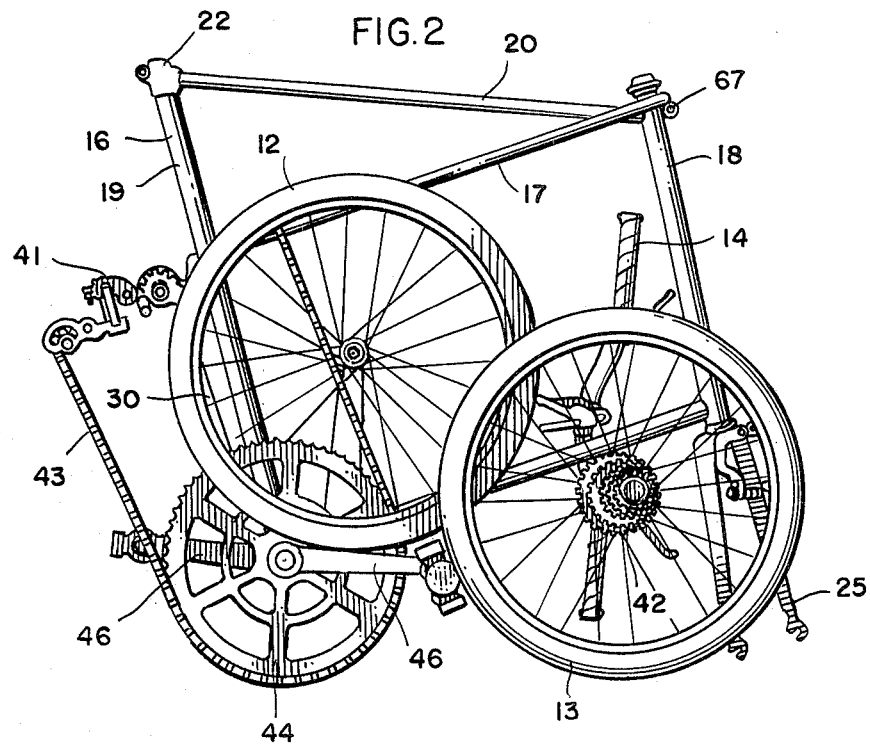
FIG. 2 is a side elevational view showing the bicycle of FIG. 1 in a collapsed position for storage.

When the struts are locked in the folded position, the frame assumes the configuration shown in FIG. 2. Since the pivot for the struts 29 and 30 is positioned very close to the center of the pedal sprocket 44, the distance between the sprocket and the derailleur mechanism will remain substantially constant as the struts pivot, and the tension on the chain will be maintained. The chain therefore remains properly engaged with the derailleur mechanism at all times. The front and rear wheels, the handlebars, and the seat can all be positioned within the area occupied by the folded frame as shown in FIG. 2, and the bicycle can be stored in this space.

While in the foregoing specification a detailed description of a specific embodiment of the invention was set forth for the purpose of illustration, it is to be understood that many of the details herein given may be varied considerably by those skilled in the art without departing from the spirit and scope of the invention.

I claim:

1. A collapsible bicycle frame comprising a front frame and a collapsible rear frame movable between riding and storage positions, the front frame including a plurality of elongated frame members interconnected to form a polygonal main frame having a front and a rear, a wheel fork rotatably mounted at the front of the main frame in one of the frame members and adapted to be connected to the axle of a bicycle wheel, the collapsible rear frame including a first pair of rear wheel support struts pivotally connected to the main frame at the rear thereof and extending rearwardly thereof, a second pair of rear wheel support struts connected to the first pair of struts and extending upwardly and forwardly therefrom, axle-connecting means on one of the pairs of struts for connecting the struts to the axle of a bicycle wheel when the rear frame is in the riding position, first connector means on the rear of the main frame for releasably connecting the upper ends of the second pair of struts to the main frame at the rear thereof whereby the first and second pairs of struts are maintained in a riding position and can rigidly support a wheel connected to the struts, and second connecting means at the front of the frame for releasably connecting the upper ends of the second pair of struts to the main frame at the front thereof when the first pair of struts is pivoted about is pivotal connection to the main frame whereby the rear frame is maintained in a storage position.

2. The bicycle frame of claim 1 in which the main frame includes a generally vertically extending front tubular frame member, a generally vertically extending rear frame member, and top and bottom frame members extending between and connected to the front and rear frame members, the first pair of struts being pivotally connected to the main frame adjacent the connection between the rear and bottom frame members, the first connecting means being mounted on the main frame adjacent the connection between the top and rear frame members whereby the rear frame members and the two pairs of struts form a triangle when the rear frame is in the riding position, the second connecting means being connected to the main frame adjacent the connection between the front and top frame members whereby the first pair of struts extends generally parallel to the rear frame member when the rear frame member is in the storage position.

3. The bicycle frame of claim 1 in which the struts of the second pair are pivotally connected to the struts of the first pair.

4. The bicycle frame of claim 1 in which the upper end of each of the struts of the second pair includes a hook, each of the first and second connector means including a shaft for holding the hooks of the struts of the second pair and locking means for releasably locking the hooks on the shaft.

5. The bicycle frame of claim 4 in which the main frame includes a generally vertically extending tubular rear frame member, a seat having a supporting shaft inserted into the upper end of the rear frame member, the locking means of the first connector means including a pair of clamping members mounted on the shaft of the connecting means, one of the clamping members being movable toward the other clamping member to clamp the hooks of the struts of the second pair and to clamp the supporting shaft of the seat with the rear frame member.

6. The bicycle frame of claim 1 in which the struts of the second pair extend on opposite sides of the main frame when the rear frame is in the storage position.

* * * * *